June 17, 1941.  J. R. JOHNSON  2,245,558
MILLING MACHINE
Filed Jan. 25, 1940
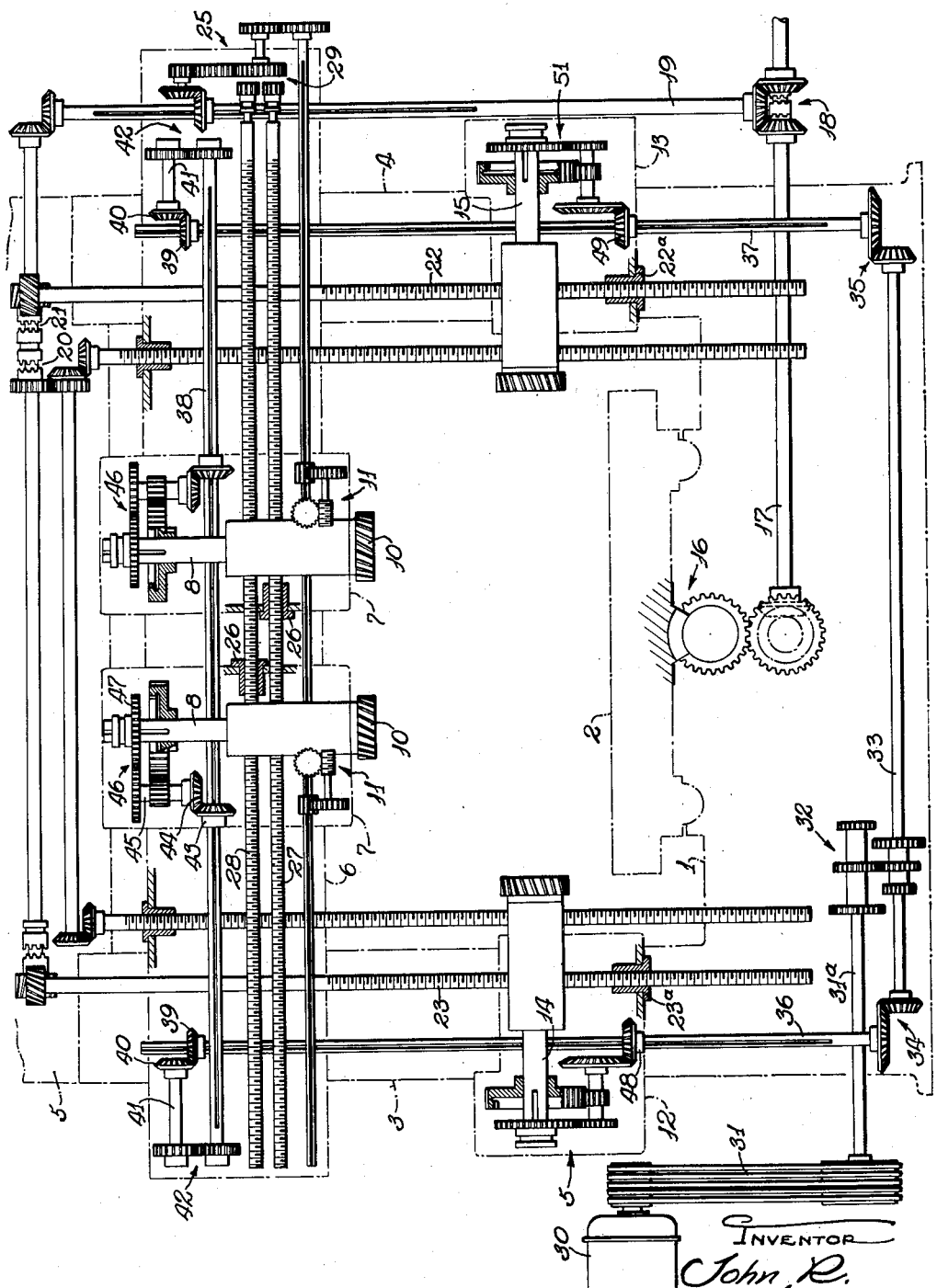
INVENTOR
John R. Johnson
By Parker, Carlson, Pitzner & Hubbell
ATTORNEYS Patented June 17, 1941

2,245,558

UNITED STATES PATENT OFFICE 2,245,558

MILLING MACHINE

John R. Johnson, Rockford, Ill., assignor to The Ingersoll Milling Machine Company, Rockford, Ill., a corporation of Illinois Application January 25, 1940, Serial No. 315,456

2 Claims. (Cl. 90—16)

This invention relates to planer type milling machines having one or more heads movable along a crossrail and other heads adjustable along vertical colums supporting the crossrail.

The object is to provide a novel arrangement of shafts and gearing for driving the tools of the rail and column heads from a single power source with minimum torsional strain on the driving parts and minimum distortion of the machine frame for a given amount of power transmitted.

Other objects and advantages of the invention will become apparent from the following detailed description taken in connection with the accompanying drawing which is an elevational view of the rotating parts of a planer type milling machine the table and frame of which is shown in phantom. Machines of this character include an elongated horizontal bed 1 providing top ways slidably supporting a reciprocable work table 2. Two vertical columns 3 and 4 are rigidly mounted at opposite sides of the bed and connected at their upper ends by a rigid bridge member 5. A horizontal crossrail 6 is mounted for vertical translation along ways formed on the columns. Horizontal ways formed along the front of the rail support one or more heads 7 having rotary spindles 8 disposed vertically and adapted to carry cutters 10 on their lower ends. The spindles are journaled in quills 9 which may be shifted axially as by means of a rack and pinion feed mechanism 11. Similar heads 12 and 13 are mounted beneath the crossrail to slide vertically along the column ways. The cutter spindles 14 and 15 of these heads project horizontally toward the table.

Power for feeding the table 2, the heads 12 and 13, and the crossrail is derived from a suitable source (not shown) and transmitted to the table feed mechanism 16 through a shaft 17 through a reversing clutch 18 which also controls the direction of rotation of a vertical shaft 19 journaled on the column 4. Through bevel gears and selectively operable gear clutches 20 and 21, the shaft 19 may be coupled to screws 22 and 23 threading through nuts 22ª and 23ª journaled in the respective column heads. Thus, either head may be traversed in either direction along its column. A shaft 24 on the rail driven from the shaft 19 through the gearing and clutches 25 may be coupled to the quill feed mechanism 11 of either head 7. The heads 7 carry nuts 26 into which thread vertical screws 27 and 28 journalled on the crossrail and driven selectively through clutches 29.

In accordance with the present invention, power for driving all of the cutter spindles 8, 14, and 15 of the four rail and column heads is derived from a single source and is distributed through two separate mechanical transmission connections extending to each of the spindles. Herein, the power source comprises an electric motor 30 operating through belts 31, a main drive shaft 31ª, and speed-change gearing 32 to drive a shaft 33 journaled in the bed 1 beneath the work table. Bevel gears 34 and 35 connect opposite ends of the shaft to two vertical spline shafts 36 and 37 rotatably supported on the two columns 3 and 4 and connected at their upper ends to horizontal spline shaft 38 journaled on the crossrail 6 and movable therewith. The end connections include bevel gears 39 splined on the shafts 36 and 37, meshing bevel gears 40, shafts 41, and spur gears 42.

The spindles 8 are driven from the shaft 38 through a bevel gear 43 splined on the shaft and meshing with a similar gear 44 on a shaft 45 journaled on the head and connected to the spindle by speed-change gearing 46 including an axially shiftable gear 47. Through similar gearing including power take off gears 48 and 49 and speed-change gearing 50 and 51, the spindles 14 and 15 are driven from the vertical shafts 36 and 37 in all vertical positions of the heads 12 and 13.

It will be observed from the foregoing that two separate drive connections extend from the motor 30 and main drive shaft 31ª to each of the cutter spindles 8, 14, and 15 and that the transmitted power is thus divided mechanically between these two connections. Thus, power is transmitted to the power take off gear 43 for each rail spindle 8 through the right hand end portion of the shaft 33, the gears 35, the vertical shaft 37, the gears 39, 40, and 42, and the right hand end of the shaft 38 while the other connection includes the left hand end of the shaft 33, the gears 34, the shaft 36, the gears 39 and 40, and the left hand end of the shaft 38. Such division of the transmitted power results in a corresponding division of the torsional stresses exerted on the shafts, gears, and couplings as well as of the forces to which the bearings and machine frame parts are subjected. It follows, therefore, that the output of the cutter on the heads 7 may be increased up to the combined power transmitting capacity of the two connections without overstressing the parts. That is to say, except for the part of the driving connection on a given head, the sizes of the shafting, gears, bearings, and frame parts may be reduced to a minimum for a given maximum load on the cutters 10.

Since the shafts 36 and 37 are coupled together at their upper ends by the shaft 33, two separate drive connections are also extended to the spindles of the column heads 12 and 13. For example, power is transmitted directly to the take off gear 48 for the spindle 14 through the gears 34 and the shaft 36. Also, power is transmitted to the upper end of the shaft 36, through the shaft 33, the shaft 37, the horizontal rail shaft 38, and the gears connecting these shafts, so as to provide the second drive connection to the spindle 14. Thus, the maximum amount of power that may be transmitted to either spindle 14 is determined not by the capacity of one drive train but of the two.

I claim as my invention:

1. A planer type milling machine having, in combination, a bed supporting a work table, upstanding columns at opposite sides of the bed, a crossrail slidable transversely on said columns, milling heads slidable vertically on said columns below said rail and each having a horizontal cutter spindle projecting toward said table, vertical spline shafts on said columns, means providing driving connections between said spindles and said shafts each including a power take off gear splined on the associated shaft, a power driven shaft rotatably mounted below said table, gearing at opposite ends of said power shaft coupling the latter to said spline shafts, a milling head slidable along said rail and having a downwardly projecting cutter spindle, a spline shaft journaled on said rail and having a power take off gear splined thereon and drivingly connected to the rail spindle, and sets of gearing providing normally engaged driving connections between opposite ends of said rail shaft and the upper end of each of said vertical shafts whereby two mechanical drive connections are extended through the respective vertical shafts to the power take off gears of each of said spindles.

2. A planer type milling machine having, in combination, a bed supporting a work table, upstanding columns at opposite sides of the bed, a crossrail slidable transversely on said columns, a milling head slidable vertically on one of said columns and having a horizontal cutter spindle projecting toward said table, a milling head slidable along said rail and having a downwardly projecting cutter spindle, vertical shafts on said columns, a power take off connection between said spindle and the associated shaft, a horizontal shaft journaled on said rail and having a power take off connection extending to said rail spindle, means providing normally engaged driving connections between opposite ends of said rail shaft and the upper end of each of said vertical shafts, a source of rotary power, and mechanical drive connections for transmitting power from said source to each of said vertical shafts whereby two mechanical drive connections are extended to the power take off for each of said spindles.

JOHN R. JOHNSON.